Figure 1:
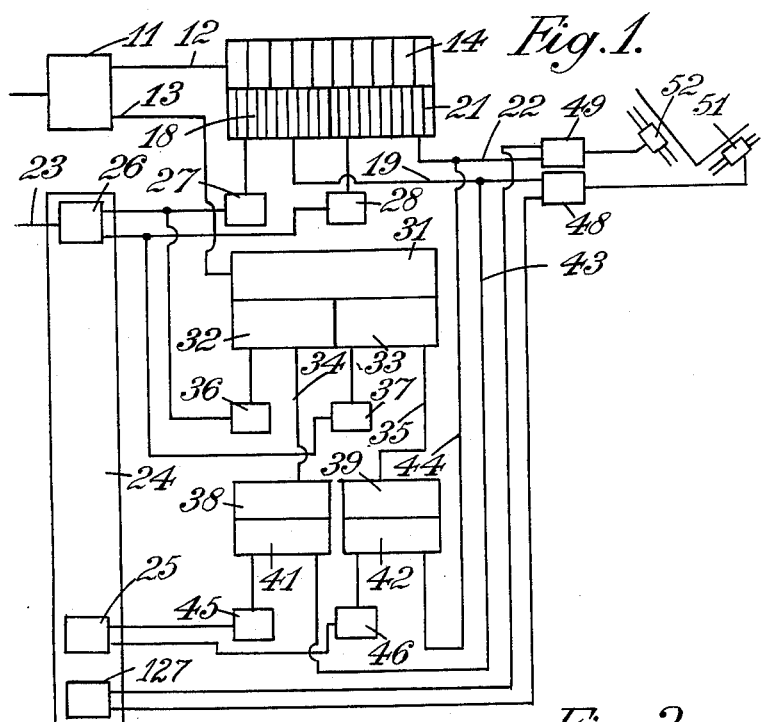

July 19, 1966  R. T. SWALE ET AL  3,262,109

DIGITAL RESOLVERS

Filed April 10, 1963

United States Patent Office 3,262,109
Patented July 19, 1966

3,262,109
DIGITAL RESOLVERS
Roy Thurston Swale and Terence Ronald Jones, London, England, assignors to Decca Limited, London, England, a British company
Filed Apr. 10, 1963, Ser. No. 272,093
Claims priority, application Great Britain, Apr. 10, 1962, 13,861/62 (provisional)
5 Claims. (Cl. 340—347)

This invention relates to resolvers for resolving digital information represented by an incremental pulse train into sine and/or cosine components. Such a resolver may be used for example in navigational apparatus e.g. radio navigational apparatus, in which signals are produced for each unit of distance travelled so that the total distance travelled is represented by an incremental pulse train, that is to say, a train of pulses the total number of which represents the distance. The heading of the craft may be known either from the navigational apparatus or from a compass and it may be required to convert this distance and heading information into signals representing components of distance in two orthogonal directions. It may be required for example to display the information as co-ordinates or to control an automatic position indicating device. However, as will be apparent from the following description the resolver of the present invention is not limited to use in such navigational apparatus.

According to this invention, a digital resolver for resolving digital information represented by an incremental pulse train into sine and/or cosine components in accordance with the angular setting of an input control comprises binary scaling means into which the input information is fed and which has a first stage for giving output pulses for each alternate input pulse and successive stages for giving output pulses for each alternate pulse from the preceding stage, a gate associated with each stage and an angle encoder comprising a switch unit which is set in accordance with the angular setting of said input control and which, in accordance with the setting of the switch, sets the various gates so that pulse outputs from appropriately selected stages of the scaling unit are fed non-coincidentally to an output circuit, the gates being selected so that the proportion of the input pulses passing through the gates gives a number of output pulses corresponding to the sine or cosine component of the input train. In general both sine and cosine components will be required and for this purpose each scaler of the scaling means may be provided with two separate sets of gates, each set having one gate for each stage of the scaler and the two sets of gates being separately controlled to give sine and cosine outputs respectively in accordance with the angular setting of the encoder. For convenience in the following description except where reference to both sine and cosine outputs are necessary, it will be convenient to consider only one such set of gates and it will be understood that the sine and cosine gates would be generally similar in construction although necessarily controlled separately.

Figure 2:
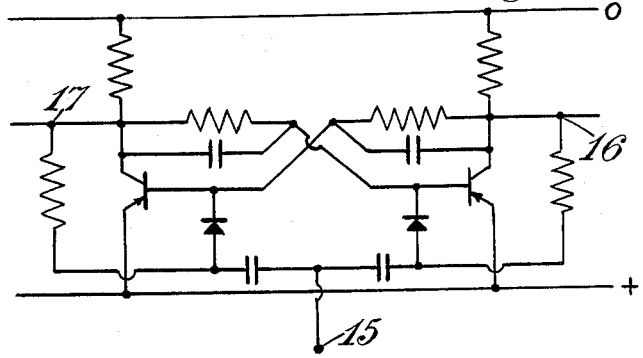

A specific embodiment of the invention will now be described by way of example with reference to the accompanying drawings, in which:

FIGURE 1 is a block diagram of a digital resolver according to the invention, and FIGURE 2 is a circuit diagram of a stage of a binary scaling unit used in the resolver of FIGURE 1.

Referring to the drawings, a digital resolver according to the invention is used in conjunction with an airborne Doppler navigation system in which pulse signals are produced corresponding to each increment of distance travelled by the craft and in which the angular position of a shaft represents the direction in which the craft is travelling.

The pulse train is fed to a monostable flip-flop 11 whose time constant is less than the minimum period between pulses of the train, so that the flip-flop has always returned to its stable state by the arrival of the next pulse. The outputs of the flip-flop 11 include differentiating and rectifying circuits so that a pulse appears on one output 12 of the flip-flop when a pulse is applied to its input, followed after a certain delay by a pulse on the other output 13.

The first output 12 of the flip-flop 11 is connected to the input of the first stage of a ten-stage binary scaling unit 14. Each stage is a bistable circuit element whose circuit is shown in FIGURE 2. As pulses are applied to the input 15, pulses appear alternately in one or the other of the outputs 16, 17. One output 16 of each stage is connected to the input of the succeeding stage and the other is connected through a gate 18 to the sine output line 19 of the unit 14 and through another gate 21 to the cosine output line 22 of the unit 14. Thus the $n$th stage supplies a pulse to the gates on one of its outputs and another pulse to the $(n+1)$th stage for every $2^n$ pulses of the pulse train.

The shaft 23 representing the direction of travel rotates an angle encoder 24 which has three coupled rotary switches. Each switch has a contact arm which sweeps over a circular ring divided into sixteen equal terminals. The first switch, shown diagrammatically at 25 rotates once for every one-sixteenth of a right angle change in direction of the craft represented by the rotation of the shaft 23. The second switch 26 is moved from one terminal to the next by a Geneva mechanism once for each revolution of the first switch 25, and the third switch 127 is moved similarly once for each revolution of the second switch 26.

A diode matrix system 27 is connected between the sixteen lines from the terminals of the second switch 26 and the ten lines to the gates 18 connecting the scaling unit 14 to its sine output line 19. The lines are shown as a single connection in FIGURE 1 for simplicity. The diodes are connected so that a voltage applied to the contact arm of the switch 26 opens the appropriate gates 18 so that the output line 19 is fed with a fraction of the incoming pulse train equal to the sine of one of the two multiples of one-sixteenth of a right angle whose sine is numerically less than the sine of the angle of the direction of the craft. A similar diode matrix system 28 connects the switch 26 to the gates 21 to provide a cosine output. The connections of the matrix systems 27, 28 are arranged so that when the actual direction of the craft lies between two adjacent multiples of one-sixteenth of a right angle, each matrix system provides an output corresponding to one multiple so that its sine or cosine is numerically less than the sine or cosine of the actual angle of the direction of the craft.

A second binary scaling unit 31, identical to 14, is connected to the second output 13 of the flip-flop 11, and has series of gates 32, 33 connected to the sine and cosine output lines 34, 35. The sixteen lines from the terminals of the second switch are connected to the ten gates 32 by a sine diode matrix system 36 which is so connected that when the actual direction of the craft lies between two adjacent multiples of one-sixteenth of a right angle, the appropriate gates are opened to provide the output line 34 with a number of pulses proportional to the numerical difference of the sines of those two multiples. A similar diode matrix system 37 is connected between the switch 26 and the gates 33 to provide a cosine difference pulse train to the output line 35.

The output line 34 is connected to a third binary scaling unit 38 having four stages constructed and connected as described above. One output from each stage is connected through a gate 41 to an output line 43. The gates 41 are connected by a diode matrix system 45 to the terminals of the first switch 25. The diode matrix system 45 is connected so that an appropriate fraction of the pulses on the line 34 is connected to the line 43 according to the setting of the first switch 25 so that the number of pulses on the line 43 is a fraction of the number applied to the input of 31 equal to the difference of the sines of the angle of the direction of the craft and of the one of the two multiples of one sixteenth of a right angle whose sine is numerically less than the sine of the direction of the craft. Since the fraction selected by the matrix system 45 is independent of the position of the second switch 26, the number of pulses on the line 43 may not be exactly correct for every setting of the second switch but the error is small. This error occurs because for example sin (90/256) degrees is not exactly in the same proportion to sin (90×16/256) degrees as $$\sin(90 \times 241/256 - 90 \times 240/256) \text{ degrees}$$

is to sin (90−90×240/256) degrees. The output line 35 is connected to a fourth four-stage binary scaling unit 39 identical to 38, one output from each stage being connected through a gate 42 to an output line 44. The gates 42 are connected by a diode matrix system 46 to the terminals of the first switch 25, to provide a similar cosine difference signal.

The sine and cosine output lines 19, 22 from the first binary scaling unit 14 are respectively connected to the output lines 43, 44 from the third and fourth binary scaling units so that the pulse trains are added together. The combined pulse trains pass through polarity controllers 48, 49 operated by voltages from the terminals of the third switch 127 of the angle encoder 26, the polarity of each pulse train from the output of the controllers 48, 49 corresponding to the sign of sines or cosines in the quadrant of the angle of the shaft input to the encoder.

The pulse train outputs are connected to plotter drive motors 51, 52 which drive the plotter in mutually perpendicular directions. The motors each revolve a certain amount for each pulse received, so that the plotter moves in co-ordinate directions in proportion to the sine and cosine outputs from the resolver and plots a track corresponding to the pulse train and shaft angle inputs to the resolver. In some Doppler systems the output from the system is in the form of two pulse trains representing increments of distance travelled along two co-ordinate directions, and in this case two resolvers as described above may be provided, one for each co-ordinate direction, in order to resolve the two pulse trains into appropriate components in the required co-ordinate directions. These components may then be combined. If for example, the shaft was set at an angle of 50°, the gates 18 would be set to allow on to line 19 a fraction of the incoming pulse train equal to sin 45° (the next lowest sine of a multiple of one sixteenth of a right angle). The gates 32 would be set to allow on to line 34 a fraction of the incoming pulse train equal to sin (50⅝°−sin 45° (the difference of the sines of the adjacent multiples of one sixteenth of a right angle) and the gates 41 would allow a fraction of the pulses on line 34 through to line 43 so that the pulses on line 43 are approximately a fraction of the incoming pulse train equal to sin 50°−sin 45°. Thus the total number of pulses fed to the polarity controller 48 is sin 50°−sin 45°+sin 45° i.e. sin 50°. As 50° is in the first quadrant, the polarity controller 48 makes the polarity of the sine pulses positive.

Since the scaling units 14, 31 have ten stages, they can accept up to 1023 (i.e. $2^{10}-1$) pulses, so that the diode matrix systems can be arranged to connect to the output lines 1023 pulses multiplied by the various sine functions. However, for convenience any number below 1023 may be used, such as 1000, by adjusting the arrangement of the matrix systems.

It will be seen that the above-described resolver will resolve accurately provided the number of pulses in the received input train is sufficient. It will be appreciated that if the angle setting should be changed, the resolver will resolve according to the instantaneous angle setting and will integrate the sine and the cosine components separately; in order to achieve the highest accuracy, the rate of change of angle setting must be relatively slow compared with the rate at which input pulses are received, so that, for any given angle, an adequate number of pulses is received to ensure that the number can be resolved accurately.

There will be no coincidence of pulses from the different stages of the scaling units 14, 31, 38, 39 since each stage does not give an output pulse to an output line and to the next stage on receipt of the same input pulse. Similarly there will be no coincidence of pulses at the function of the output lines 19 with 43 and 22 with 44 since the flip-flop 11 given pulses alternately to units 14, 31. There is therefore no chance of losing a pulse in the train by coincidence with another.

There is no necessity for the right angle to be divided into sixteen parts. For example, the second switch 26 could have nine terminals, giving coarse steps of ten degrees while the first switch would then have ten parts giving one degree steps.

For many purposes it may happen that the input pulses may represent positive or negative increments. Control or identification signals may be provided in this case to indicate the sense or the pulses may have a polarity representative of the sense. This happens for example in a navigation system where pulses may represent movement towards or away from the origin of the co-ordinate system. In such a case the first scaler can be made a reversible binary scaler able to count up or down and the direction of count being controlled by said control or identification signals in accordance with the required sense of the input pulses. In one arrangement, the input pulses have a polarity representative of their sense and are fed into two mono-stable flip-flops arranged so that positive pulses actuate one mono-stable unit and negative pulses the other. The mono-stable units control feedback lines within the scaler so that the direction of count of the scaler depends on which of the two mono-stable units is actuated.

We claim:

1. A digital resolver for resolving digital information as represented by an input incremental pulse train into a resolved sine component represented by a pulse output proportioned in accordance with the input angle of an input control member, said resolver comprising:

an input and an output said input being coupled to receive said incremental pulse train;

first and second binary scaling means coupled to said input, each binary scaling means having a first stage for giving output pulses for each alternative input pulse and a plurality of serially arranged successive stages for giving output pulses from each alternate pulse from the preceding stage;

first and second gating means coupled to receive the outputs from said first and second binary scaling means;

a first angular encoder coupled to said input control member;

said angular encoder having a plurality of positions corresponding to coarse steps of angle within a quadrant;

means conditioning said first gating means to pass to said resolver output a proportion of the number of received pulses corresponding to the sine of a first coarse angular step next below said input angle and conditioning said second gating means to pass a proportion of the number of received pulses corresponding to the difference between the sines of the two coarse angular steps on either side of said input angle, the sine of said first coarse angular step being less than that of said input angle;

a second angular encoder coupled to said first angular encoder;

said second angular encoder having a plurality of positions corresponding to fine steps of angle within a coarse step as represented by said first angular encoder, said first and second angular encoders being coupled to said input member such that the sum of their angular indications represents said input angle;

third gating means coupled to the output of said second gating means;

further means coupled to said second angular encoder and to said third gating means;

said further means conditioning said third gating means to pass to said output a fraction of the pulses from said second gating means, said fraction being linearly related to the setting of said second encoder;

whereby the number of pulses at said output is proportioned, with respect to said incremental pulse train, in accordance with the sine of said input angle.

2. A digital resolver as claimed in claim 1, wherein there is provided flip flop means coupled to said resolver input and feeding alternate input pulses to said first and second binary scaling means.

3. A digital resolver as claimed in claim 2 wherein there are provided polarity control means coupled to said resolver output and quadrant sensing means sensing the quadrant of said input angle and controlling said polarity control means to provide output pulses of a selected polarity corresponding to the sign of the sine or cosine of said input angle.

4. A digital resolver as claimed in claim 2, wherein said conditioning means comprise diode matrix means coupled between a respective angular encoder and a respective gating means.

5. A digital resolver for resolving digital information as represented by an incremental pulse train into a resolved sine component represented by a pulse output proportional in accordance with the angular setting of an input control member, said resolver comprising:

an input and an output, said input being coupled to receive said incremental pulse train;

first and second binary scaling means coupled to said input, each binary scaling means having a first stage for giving output pulses for each alternate input pulse and a plurality of serially arranged successive stages for giving output pulses from each alternator pulse from the preceding stage;

first and second gating means coupled to receive the outputs from said first and second binary scaling means;

a first angular encoder coupled to said input control member;

said first angular encoder having a plurality of positions corresponding to coarse steps of angle within a quadrant;

flip-flop means coupled to said resolver input and feeding alternate input pulses to said first and second binary scaling means;

diode matrix means coupled to said first angular encoder and conditioning said first gating means to pass to said resolver output a proportion of the number of received pulses corresponding to the sine of a first coarse angular step next below said input angle and conditioning said second gating means to pass a proportion of the number of received pulses corresponding to the difference between the sines of the two coarse angular steps on either side of said input angle, the sine of said first coarse angular step being less than that of said input angle;

a second angular encoder coupled to said first angular encoder;

said second angular encoder having a plurality of positions corresponding to fine steps of angle within a coarse step as represented by said first angular encoder, said first and second angular encoders being coupled to said input member such that the sum of their angular indications represents said input angle;

third gating means coupled to the output of said second gating means;

further diode matrix means coupled to said second angular encoder and to said third gating means;

said further diode matrix means conditioning said third gating means to pass to said output a fraction of the pulses from said second gating means, said fraction being linearly related to the setting of said second encoder; whereby the number of pulses at said output is proportioned, with respect to said incremental pulse train in accordance with the sine of said input angle;

polarity control means coupled to said resolver output; and quadrant sensing means sensing the quadrant of said input angle and controlling said polarity control means to provide output pulses of a selected polarity corresponding to the sign of the sine of said input angle.

References Cited by the Examiner

UNITED STATES PATENTS

| | | | |
|---|---|---|---|
| 2,951,202 | 8/1960 | Gordon | 324—79 |
| 2,995,302 | 8/1961 | Ingwerson et al. | 235—152 |
| 3,075,189 | 1/1963 | Lisicky | 343—7.3 |
| 3,134,974 | 5/1964 | Orenstein | 343—11 |

MAYNARD R. WILBUR, *Primary Examiner.*

MALCOLM A. MORRISON, DARYL W. COOK,
*Examiners.*

A. L. NEWMAN, *Assistant Examiner.*